United States Patent [19]
Stoever

[11] Patent Number: 6,092,331
[45] Date of Patent: Jul. 25, 2000

[54] PLANTING CONTAINER AND METHOD OF MAKING THE CONTAINER

[76] Inventor: Hermann Stoever, Auf den Dillen 11, D 27239 Twistringen, Germany

[21] Appl. No.: 09/019,652

[22] Filed: Feb. 6, 1998

[30] Foreign Application Priority Data

Feb. 11, 1997 [DE] Germany .............. 197 05 130

[51] Int. Cl.⁷ .................................................. A01G 9/02
[52] U.S. Cl. ........................................ 47/74; 47/84; 47/77
[58] Field of Search ................... 47/23, 24, 65.5, 47/65.7, 65.8, 73, 74, 78

[56] References Cited

U.S. PATENT DOCUMENTS

| | | | |
|---|---|---|---|
| 2,389,870 | 11/1945 | Reevely | 47/57.5 |
| 4,369,599 | 1/1983 | Franclet et al. | 47/74 |

FOREIGN PATENT DOCUMENTS

| | | |
|---|---|---|
| 1582057 | 7/1970 | Germany . |
| 7936342 | 5/1980 | Germany . |
| 2902562 | 5/1986 | Germany . |
| 9100889 | 5/1991 | Germany . |
| 9417960 | 1/1995 | Germany . |

*Primary Examiner*—Peter M. Poon
*Assistant Examiner*—Francis T. Palo
*Attorney, Agent, or Firm*—W. F. Fasse; W. G. Fasse

[57] ABSTRACT

Planting containers of substantial sizes are made by rolling up previously prepared mats of natural fibers that are biodegradable and contain a growing medium in the mats. A rolled-up coil of such mats is held together by stitching or netting or wire mesh or the like. The mats are rolled onto a removable core. Once the coil is finished and the core is removed, the resulting space inside the coil will be closed at the bottom by a plug also of biodegradable material.

23 Claims, 5 Drawing Sheets

PLANTING CONTAINER AND METHOD OF MAKING THE CONTAINER

PRIORITY CLAIM

This application is based on and claims the priority under 35 U.S.C. §119 of German Patent Application 197 05 130.8, filed on Feb. 11, 1997. The entire disclosure of German Patent Application 197 05 130.8 is incorporated herein by reference.

FIELD OF THE INVENTION

The invention relates to a biodegradable container for planting or holding plants, especially large sized containers, the wall of which is made of natural fibers holding a growing medium. The invention also relates to a method for making such containers.

BACKGROUND INFORMATION

It is known to make flower pots of natural fibers and to grow plants in these pots which are easily inserted into the ground with the advantage that it is no longer necessary to remove the plants out of the pots prior to planting in the ground. Compared to flower pots made of synthetic materials or of clay, the biodegradable pots do not pose any waste disposal problems because the natural fibers bio-degrade in about four to six years and become part of the soil.

However, conventional pots of natural or plant fibers can efficiently be made only in relatively small sizes. Beyond a certain pot size conventional pots of natural fibers become unstable due to the weight of the growing medium so that any growing medium held in such pots is no longer properly held in place and transporting such pots with the growing medium therein is no longer possible. Conventional pots of natural fibers also can no longer stand by themselves when a certain size is exceeded because the pressure of the soil inside the pot becomes too large, whereby the pot can no longer retain its desired shape or it even breaks. Thus, it is conventionally customary to set large plants into correspondingly large buckets of hard materials such as burned clay or concrete or synthetic plastics. Depending on the size of these bucket containers, they must be transported separately to the planting location and planting can then only take place once these large buckets or planters have been placed. Thereafter, further movement is generally only possible with motorized equipment.

OBJECTS OF THE INVENTION

In view of the foregoing, it is the aim of the invention to achieve the following objects singly or in combination:

- to provide large, yet lightweight biodegradable planters that can be manufactured efficiently and economically of natural fibers or other biodegradable materials;
- to construct these planters in such a way that they satisfy the growing conditions for any type of plant;
- these planters shall be rigid in themselves and remain transportable substantially independently of their size and so that their positioning is possible in any desired location without heavy equipment;
- to make planting pots of different sizes from a fiber and growing medium mat that is substantially the same for different pot sizes;
- to control the quantity or volume of growing medium by the number of turns of the mat that forms the container wall; and
- to determine the hollow space inside the container by the size of a central removable winding core onto which a mat forming the container wall is wound.

SUMMARY OF THE INVENTION

A planting container according to the invention is characterized by a mat made of natural fiber material and a plant growing medium held in said mat. The mat is wound into at least one full turn to form a coil that is the container wall surrounding a planting space. The ends of the at least one full turn of the mat are held together by various fastening devices such as stitching, particularly quilt stitching, gluing, heat welding, or by surrounding the at least one turn or coil by a wire ring or belt or wire mesh or any suitable netting. All of these devices for holding the turn or coil together are biodegradable. For example, so-called black wire of soft iron rusts away in a few years.

The present plant container is manufactured by the following steps. First, a web such as a netting of natural fibers is formed as an elongated enclosure material and placed on a flat support surface. Then a growing medium is placed onto the elongated enclosure material. The growing medium may itself be prepared as a layer material. After placing the growing material, the natural fiber enclosure material is closed all around to form an elongated mat which is then wound into at least one turn or into a coil with several turns. The winding is performed on a core, the diameter of which determines, once the core is removed, the inner diameter of the plant container. In the final step an outer end of the turn or coil is secured so that the turn or coil cannot unwind. In a preferred embodiment spacers or inserts of biodegradable material are placed at predetermined intervals along the elongated enclosure material. When the mat is finished it is cut through the inserts to form mat sections having the length of the intervals just sufficient to roll the mat section into one container wall having the required number of turns.

The most important advantage of the invention is seen in the formation of a lightweight container that is stable in itself and can be manufactured in sizes that heretofore could be made only of concrete or other hard materials. Other advantages are seen in that the number of turns to form the coil and thus the container wall can be easily adapted to the size of the container and thus to the size of the plants to be held in the container. Further, by selecting the size of the inner winding core, particularly its diameter and its length, the volume that can receive additional planting or growing medium is easily determined.

BRIEF DESCRIPTION OF THE DRAWINGS

In order that the invention may be clearly understood, it will now be described, in connection with an example embodiment of the invention with reference to the drawings, wherein.

DETAILED DESCRIPTION OF PREFERRED EXAMPLE EMBODIMENTS AND OF THE BEST MODE OF THE INVENTION

Figure 1:
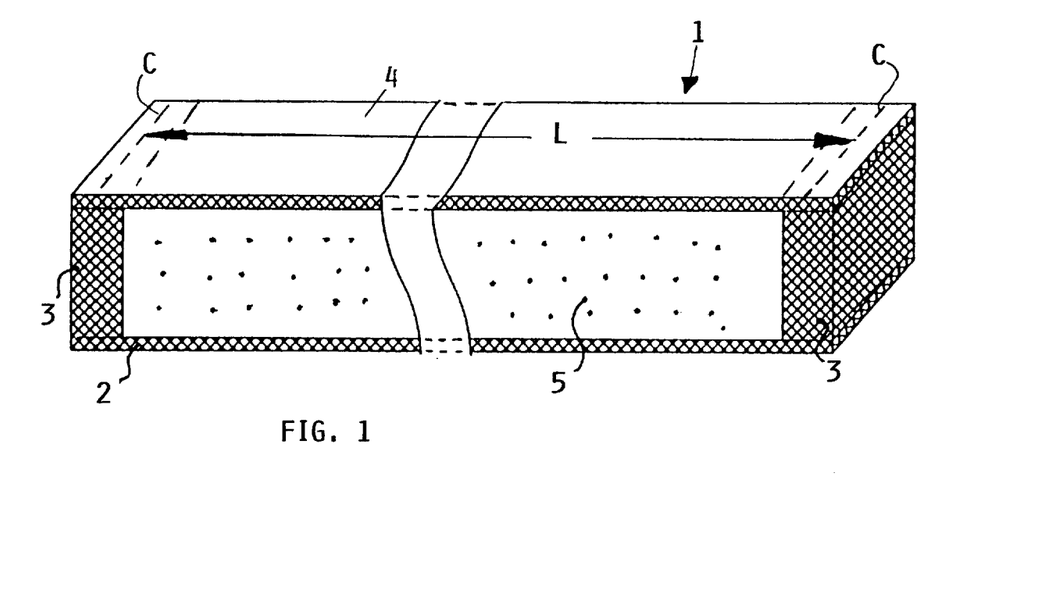
FIG. 1 is a perspective sectional view along section plane I—I in FIG. 2 illustrating a mat according to the invention for making the present plant containers.
Figure 3:
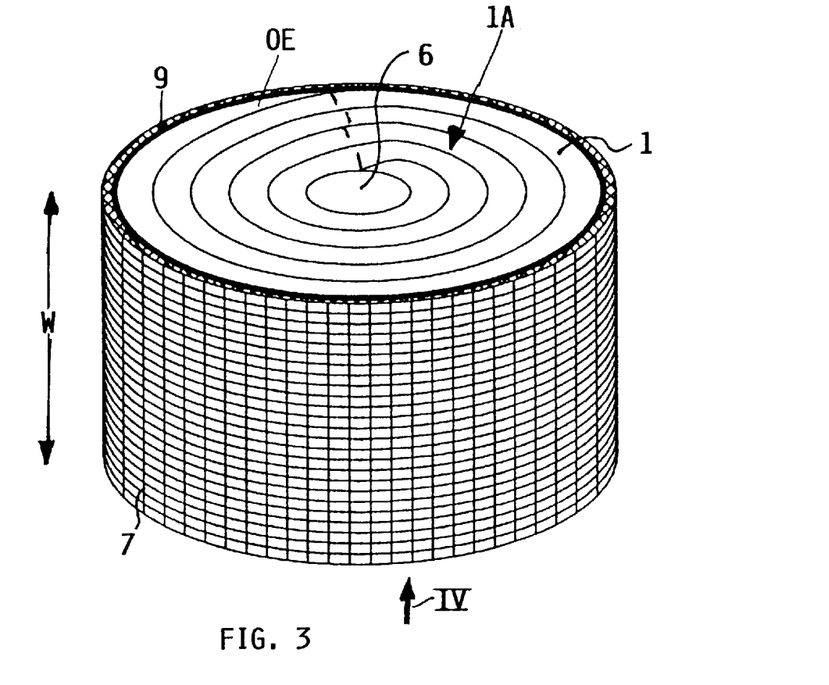
FIG. 3 is a perspective view of the plant container according to the invention with a mat according to FIGS. 1 and 2 rolled into a coil.

FIG. 1 shows a mat 1 for manufacturing the present plant containers, for example as shown in FIG. 3. The mat 1 comprises a webbing or netting or sheeting of natural fiber material 2 produced in different widths. The width and thickness of the natural fiber material 2 depends on the intended use and any required length may be cut-off from rolls. A prepared growing medium 5 is placed onto the fiber material 2 and spacers 3 are placed crosswise to the length of the fiber material 2 to separate batches of growing medium 5 from each other. The spacers 3 are also made of natural fibers. A cover 4 also of natural fibers is combined with the fiber material to form an enclosure for the growing medium 5.

Figure 2:
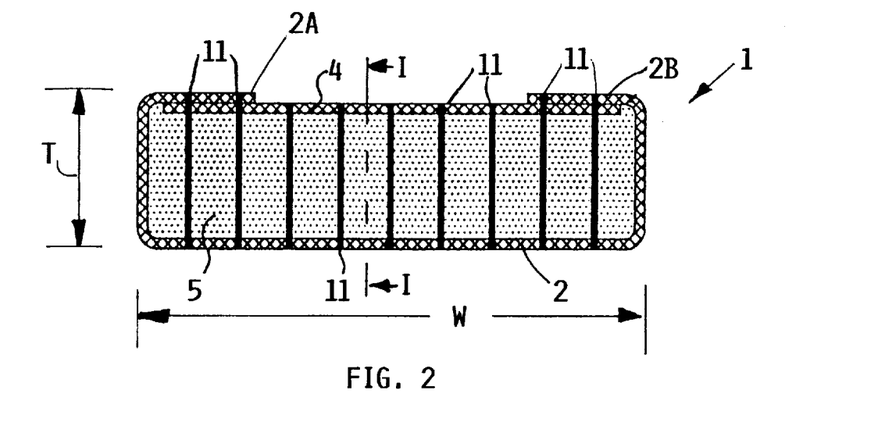
FIG. 2 is a sectional view perpendicularly to the longitudinal axis of a finished mat according to the invention, whereby the longitudinal axis of the mat extends perpendicularly to the drawing sheet.

FIG. 2 shows the formation of the enclosure by folding the longitudinal edges 2A and 2B of the fiber material 2 over or under the cover 4 and then applying quilting stitching or seams 11 to the whole package to form the mat 1. Upon completion of the stitching the mat 1 is finished. For practical purposes the mats 1 have a width W within the range of 20 to 100 cm and a thickness T within the range of 2 to 10 cm. However, mats with other dimensions can readily be manufactured if necessary. The width W will determine the depth of a container. Due to the above mentioned folding of the longitudinal edges 2A, 2B of the fiber material 2, the thickness T of the present mats is uniform throughout the width W of the mat as best seen in FIGS. 1 and 2.

Referring further to FIG. 1, the spacers 3 are spaced from each other along the length of a mat 1 at on-center spacings L. The purpose of the spacers 3 is to prevent growing medium 5 to fall out of the mat when the mat is cut into pieces with the length L, whereby the cutting takes place along a center plane C of the spacers 3. The length or spacing L between the divider 3 is selected in accordance with the number of turns to be obtained when the mat sections are rolled up as shown, for example in FIG. 3 to form the present planting containers.

FIG. 3 shows a container according to the invention. The mat 1 has been rolled onto a winding core 6 to form a coil 1A with, for example a total of 5 turns. The outer end OE of the outermost turn is held in place by any one or more of various devices which may be applied singly or in combination, such as quilt stitching, adhesive bonding, heat bonding, a wire mesh, envelopes, belts, rings, cuffs, netting and fabrics. All of these devices are made of biodegradable material. In FIG. 3 the turns are held together by an envelope of a film 9 that is water tight and biodegradable. The material of the film 9 may, for example, be corn starch formed as a sheet which may be reinforced, for example by natural fibers. FIG. 3 further shows a wire mesh cage 7 that surrounds the envelope 9. The wire mesh cage 7 is, for example, made of soft or black iron that rusts away relatively quickly. Alternatively, the wire mesh 7 may be replaced by a netting of plant fiber material that can be bonded to the film 9 or, if no envelope film 9 is used, it can be bonded directly to the outer turn of the spirally wound up coil 1A. It has been found to be advantageous to adhesively bond the netting 7 of natural fibers to the coil 1A at least along that part of the coil that will form the outer turn. The netting or mesh 7 may be applied to the natural fiber material 2, for example by adhesive bonding even before the natural fiber material 2 is formed into the mat 1. Any adhesive used herein will also be biodegradable. Upon completion of the coil 1A and its enclosure the core 6 may be removed and the bottom of a resulting planting space or hole 12 shown in FIGS. 6 and 9 will be closed by a plug 10 or 19 to be described below.

The present mats 1 are manufactured by machines in relatively long sheets or webs which are then cut along the center plane C of the inserts or spacers 3. Especially in the manufacture of smaller plant containers it has been found to be economical to apply the netting 7 by adhesive bonding. However, other ways of enclosing the coil 1A by a netting may be employed. For example, the netting may have a hose configuration which is cut into the required length corresponding to the width W of the mat 1. Alternatively, the netting may have a larger width as described below.

Figure 4:
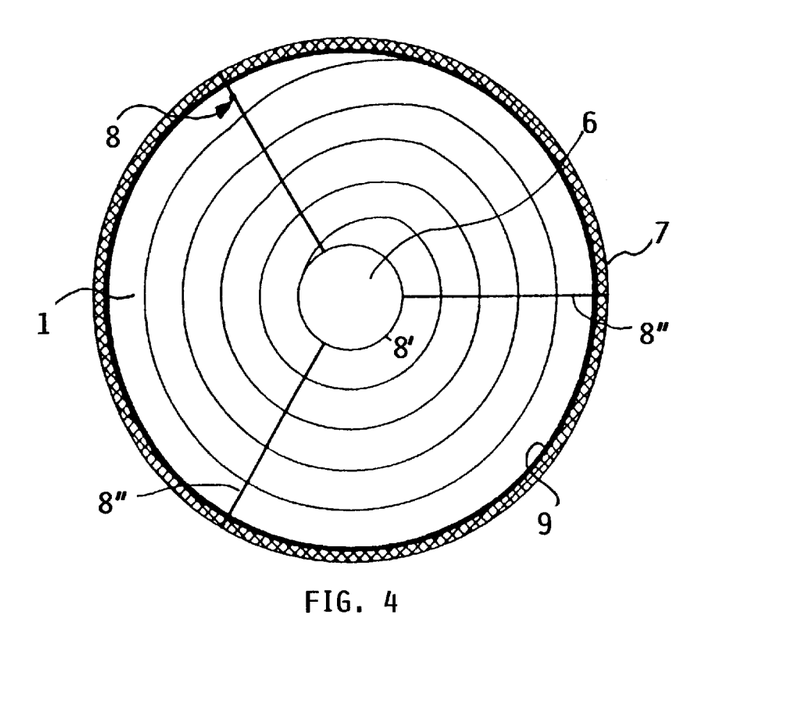
FIG. 4 is a view in the direction of the arrow IV in FIG. 3 to illustrate a bottom reinforcement.

FIG. 4 is a view in the direction of the arrow IV in FIG. 3 and shows a reinforcement member such as a spider 8 having, for example three arms 8" radiating out from an inner ring 8' while the outer ends of the arms 8" are connected to a lower edge of the wire mesh or netting 7, whereby the bottom of the container, or rather the bottom of the coil 1A is supported by the spider 8.

Figure 5:
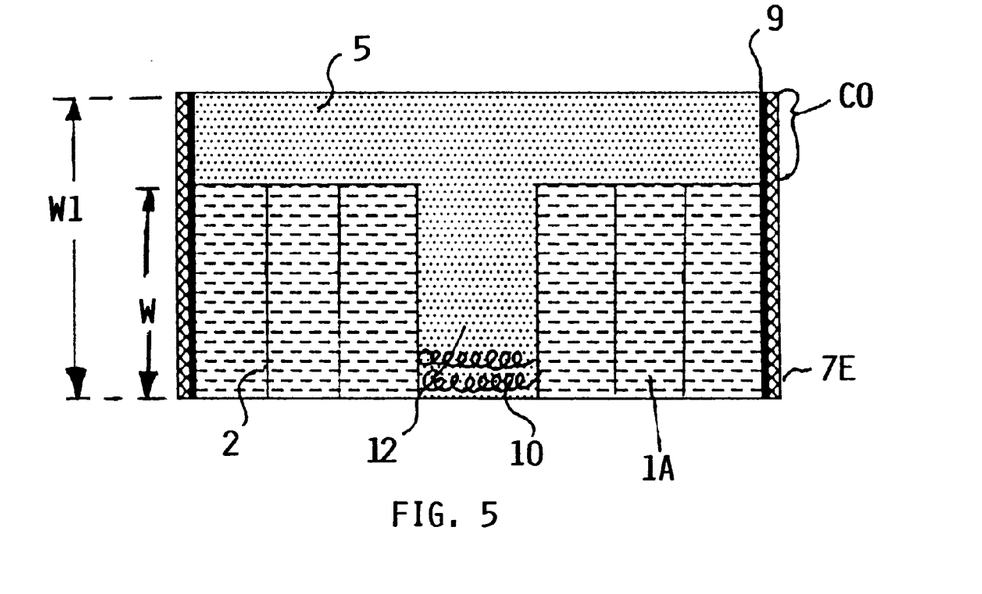
FIG. 5 is an axial sectional view through a modified plant container according to the invention.
Figure 5A:
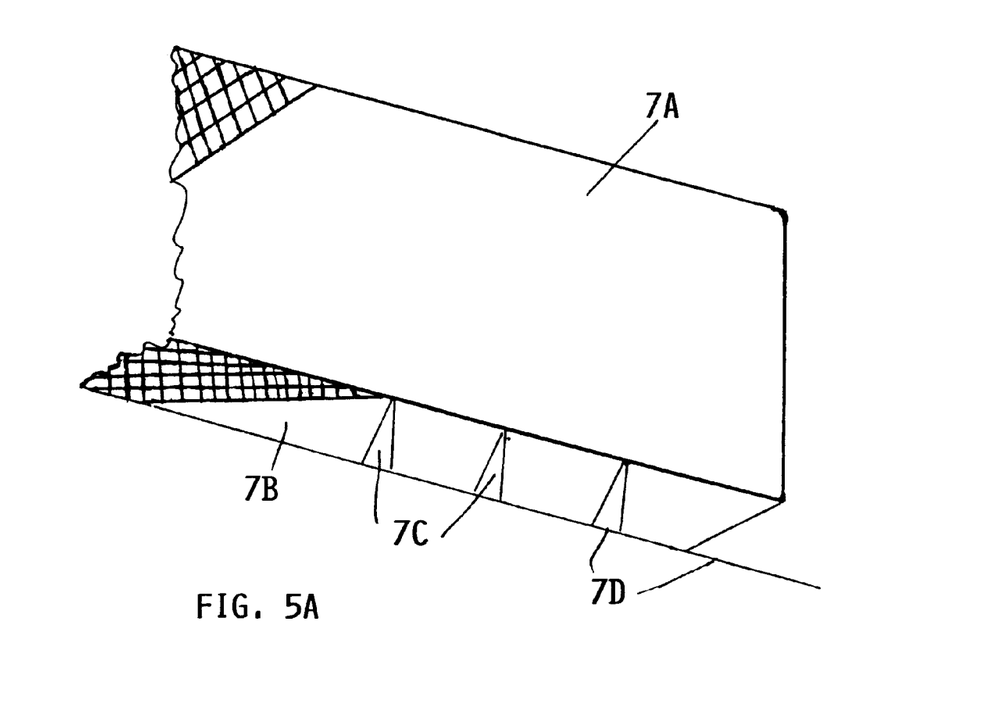
FIG. 5A shows a perspective view of a wire mesh material with a bent-over longitudinal edge for use in the present containers.

FIG. 5A shows a similarly effective bottom reinforcement or support provided, for example by a mesh material 7A having a longitudinal edge 7B bent over by 90°. The bent-over edge 7B is provided with gussets or folds or cut-outs 7C and, for example with a drawstring or wire 7D, so that when a cage of netting or mesh material 7 is formed, the radially inwardly extending edge 7B may be pulled together in a circle that is tied by the drawstring 7D.

FIG. 5 shows a sectional view through a finished container which comprises a mesh or netting cage 7E having a width or height W1 larger than the width W of the coil 1A. The coil 1A has, for example, three turns. Due to the width W1 of the wire mesh and preferably also of the film envelope 9 a collar CO is formed that surrounds extra space above the coil 1A for holding additional growing medium 5 that is also filled into the planting space or hole 12 from which the plug 6 has been removed. A fiber material plug 10 closes the bottom of the planting space or hole 12. Whether or not the construction of FIG. 5 is employed will depend on the intended use of the present planting containers. Such construction is particularly suitable for flower pots since seeds may be placed into the top portion of the growing medium 5. Containers for bushes and/or trees may not require the collar CO. However, the ability of the collar CO to retain water may be desirable even for planting bushes and trees. The water retaining collar CO requires that the film 9 has a width sufficient for the retaining purpose.

Figure 6:
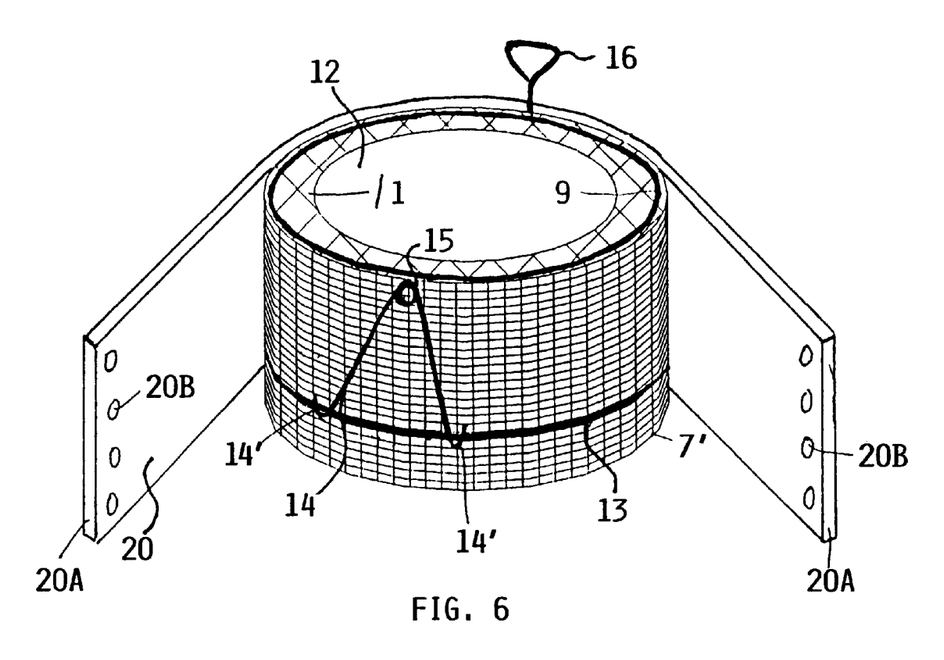
FIG. 6 is a perspective view similar to that of FIG. 3 and illustrates additionally a cuff and a carrier ring.

When the present containers are intended for the planting of larger plants, such as trees and bushes, the diameter of the removable core 6, for example made of cardboard material, will have a respective larger diameter to provide a planting space or hole 12 as shown in FIG. 6, whereby the space or hole 12 may be surrounded by one or more turns of the coil 1A of the mat 1. Generally, the core 6 will be removed after the winding is completed or after the coil is properly held in a mesh cage or the like. In the embodiment of FIG. 6, the cage 7' is additionally surrounded by at least one belt or ring 13 of soft iron or a braided fiber belt. These belts or rings 13 degrade in time. This is true also for so-called soft iron that rusts away in about 5 to 6 years. Similarly, cocoa fibers will degrade in about 5 to 6 years. The use of cocoa fibers is preferred for the present planting containers.

FIG. 6 further shows a bail 14 secured with its inner hook ends 14' to the belt or ring 13. The bail 14 has an eyelet 15 that reaches close to the top rim of the container for the insertion of a handle 16 to facilitate the transport of the containers. Preferably, but not necessarily, the eyelet or eyelets will not protrude above the upper edge or rim of the coiled mat 1.

The netting 7' or the wire mesh 7' may be painted to improve the container appearance. Additionally or instead, a cuff 20 also made of biodegradable material, is wound around the netting or mesh 7'. Natural fibers of a texture finer than that of cocoa fibers is preferred for making the cuff 20. The cuff 20 may be colored or painted and its ends 20A are, for example, tied together by a rope passing through holes 20B. The rope is not shown. However, the ends of the cuff 20 may also be secured to each other by an adhesive or by any other suitable means such as a hook and loop connector (Velcro®).

As shown in FIG. 6, the eyelet or eyelets 15 do not protrude over the upper rim or edge of the container so that normally these eyelets 15 are not visible. However, the eyelet or eyelets 15 must be accessible for a handle 16 that is temporarily inserted into the eyelet 15 and when the transport is completed the handle 16 is removed again.

Figure 7:
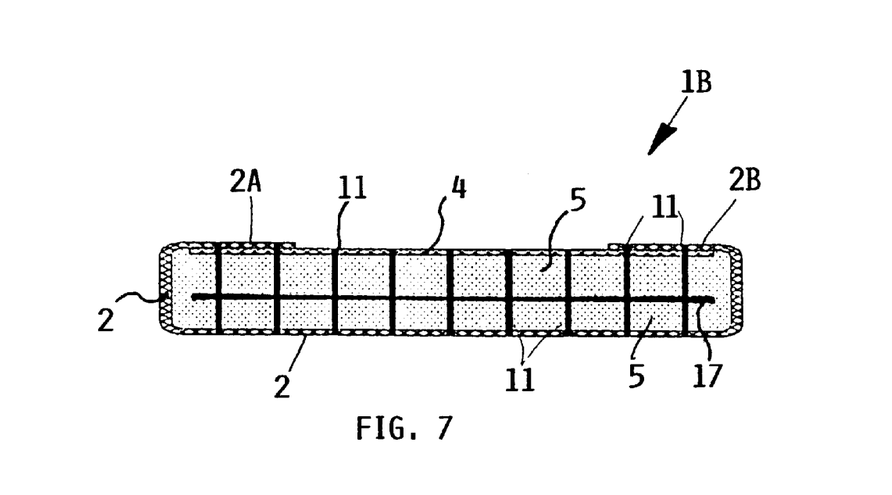
FIG. 7 is a sectional view similar to that of FIG. 2, but shows additionally a reinforcing wire mesh inserted into the mat.

FIG. 7 is a view similar to that of FIG. 2 and shows the insert of a reinforcing wire mesh 17 into the mat 1B. The manufacture of the mat 1B is substantially the same as that described above with reference to FIG. 2, whereby making the mat 1B merely involves placing the wire mesh into the growing medium 5 or next to the fiber mat 2 prior to applying the quilt stitching 11 so that the wire mesh 17 is held by the stitching in the mat 1B, thereby substantially increasing the strength of the container while simultaneously enclosing edges of the wire mesh 17 to thereby prevent injuries.

Figure 8:
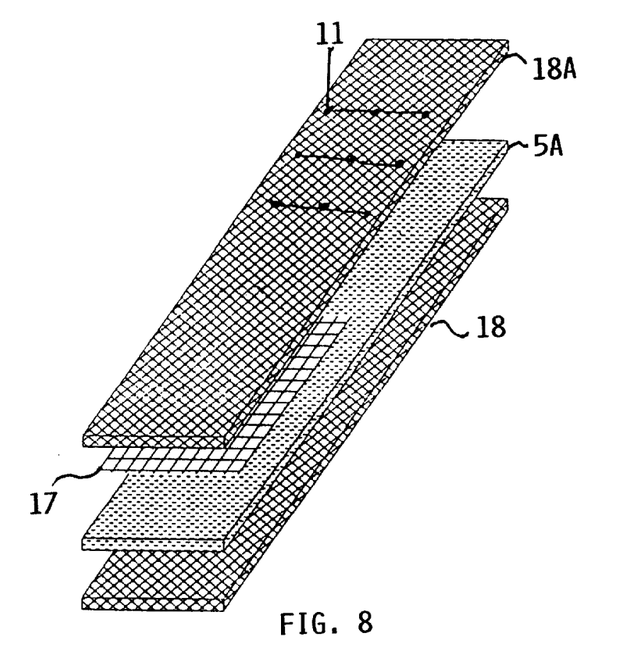
FIG. 8 is a perspective exploded view of a modified mat made of several layers.

Rather than forming the mat 1 or 1B a tubular enclosure formed by the fiber material 2, it is possible to stitch different layers of materials to one another as shown in FIG. 8. In the embodiment of FIG. 8, the growing medium 5A itself has been prepared separately as a mat, for example of fiber material in which the growing medium 5A is embedded. Thus, a sandwich structure is formed, for example including outer degradable fiber layers 18 and 18A and an inner growing medium web or sheet 5A between the outer layers, whereby the layers 18, 18A and 5A have the same length. Additionally, a wire mesh layer 17 of shorter length is so placed near one end of the layers in the layer structure that after the quilt stitching 11 has been completed and the mat is rolled up into a coil, the layer 17 will be positioned in the outer turn of the coil. Therefore, the length of the wire mesh 17 in the direction of the length of all the layers of the sandwich structure is so selected, that it will be at least long enough to cover the entire circumference of an outer turn of the coil 1A. In the structure of FIG. 8 it is no longer necessary to use the spacers or inserts 3 because the growing medium is held in a layer 5A of its own. Incidentally, the wire mesh 17 may also have a bent-over longitudinal edge as shown in FIG. 5A to be used in FIG. 8, whereby the gussets or folds 7C will serve for the same purpose when the sandwich mat is rolled up in a spiral form as is shown in FIGS. 3 and 4. The bent-over edge 5B will reach radialy inwardly and thereby support the coil 1A.

The number of turns to be made for any particular type of container when forming the coil, will depend on the type of plants to be held in these containers, which is an advantage of the invention because for smaller containers even one turn will result in a sufficiently robust container. Normally, two turns in the coil will be sufficient for a wide range of strength requirements. In any event, the size of the planting space or hole 12 inside the coil will always depend on the diameter of the removable core 6.

Figure 9:
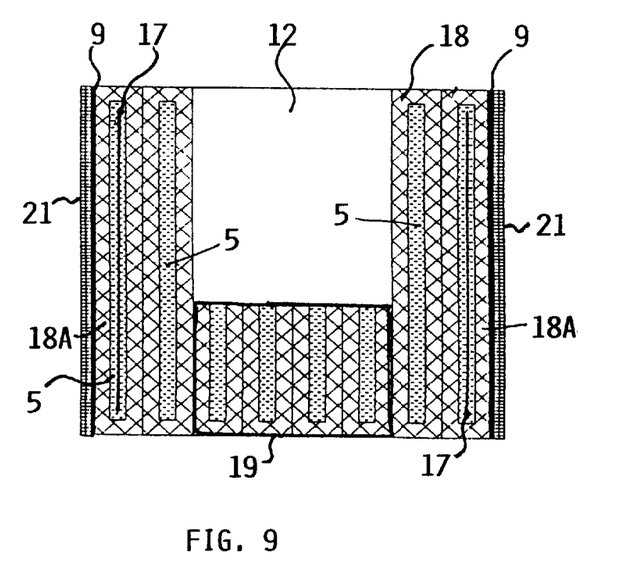
FIG. 9 is an axial sectional view through a container formed of a mat according to FIG. 8.

FIG. 9 shows a container made of a mat prepared as shown in FIG. 8, whereby the container coil has two turns with the wire mesh 17 positioned in the outer turn which is further surrounded by a water impermeable or water tight film 9 as described above that in turn is surrounded by one or more layers of a natural fiber fabric 21 held in place as described above, for example, by an adhesive or the like. Preferably, The film 9 is biodegradable.

FIG. 9 further shows that the bottom of the inner planting space or hole 12 is closed by a plug 19 formed from a smaller mat as shown in FIG. 8 and without the wire mesh 17. The plug is made by winding such smaller mat to the required plug size and then pressing the plug into the lower end of the opening. Normally, the plug 19 will be held in place by a press fit. However, the use of a spider 8 as shown in FIG. 4 may also be advantageous in the embodiment of FIG. 9 for holding the plug 19 in place. The plug will be made of biodegradable material or any other suitable material that will not harm the plants while providing the required decomposition over time.

Depending on the cross-sectional configuration of the plug 6, the present containers may be formed not only in a round configuration, but also in various other configurations such as oval, square, or rectangular configurations. Any outer layers such as the wire mesh 7 or the cuff 20 may be colored or painted for improving the appearance of the containers.

By the use of natural fibers such as cocoa fibers, the present containers have a substantial advantage over containers of plastic synthetic materials, clay containers and concrete containers because the natural fibers tend to hold the moisture uniformly throughout the volume of the turns in the coil and also in the growing medium 5 or 5A. The fibers, especially cocoa fibers are moisture resistant for prolonged periods of time and are also resistant against the radiation of the sun, whereby the temperatures are more uniformly retained for a longer period of time in the present containers with the growing medium held in the coils as compared to conventional containers which are subject to substantial temperature variations between day and night. This beneficial temperature effect of the present containers can be even increased by impregnating or soaking the natural fibers with special treatment liquids which as such are known in the art. before the mats are formed. The mats are normally tight enough so that the container will retain the moisture for prolonged periods of time. However, as mentioned above, the escape of water can be avoided or at least slowed down by the above mentioned biodegradable film 9.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A planting container, comprising a mat (1) made of natural fiber material (2), said mat having a uniform thickness (T) throughout its width (W), a plant growing medium (5) held in said mat (1) throughout said uniform width, a mat coil having at least one full turn of said mat forming a container wall surrounding a planting space (12), means holding an end of said at least one full turn of said mat coil of natural fiber material in place around said planting space to avoid uncoiling, and a plug (10, 19) closing said planting space (12) at a bottom end of said planting container.

2. The planting container of claim 1, wherein said mat (1) comprises a sheet and a cover (4) of said natural fiber material (2), said sheet having longitudinal sheet edges (2A, 2B) turned over to enclose with said sheet and with said cover (4) said growing medium, said mat further comprising spacers (3) of natural fibers forming with said sheet and cover an enclosure in which said growing medium (5) is contained, said spacers (3) extending crosswise to the length of said mat for separating batches of growing material from each other and to permit cutting said mat (1) into pieces along said spacers (3).

3. The planting container of claim 2, further comprising securing means (11) holding said sheet edges (2A, 2B), said cover (4) and said spacers (3) together to form said mat (1).

4. The planting container of claim 2, wherein said sheet edges (2A, 2B) overlap said cover (4).

5. The planting container of claim 1, further comprising a wire mesh insert (17) in said mat (1).

6. The planting container of claim 1, wherein said mat comprises two natural fiber layers (18 and 18A), a growing medium layer (5A) and a wire mesh layer (17) sandwiched between said two natural fiber layers, and quilting seams or stitches (11) holding all layers together.

7. The planting container of claim 6, wherein said wire mesh layer (17) comprises a longitudinal bent-over edge that faces inwardly when the mat and wire mesh layer are rolled up, whereby said bent-over edge of said wire mesh layer supports said coil at its bottom.

8. The planting container of claim 6, wherein said wire mesh layer is shorter than said two natural fiber layers and shorter than said growing medium layer, and wherein said shorter wire mesh layer is positioned next to one end of said mat so that said wire mesh layer is enclosed in an outer turn of said coil upon completion of said coil.

9. The planting container of claim 1, further comprising a biodegradable water-tight film (9) enveloping said mat coil, and a natural fiber fabric (21) enveloping said film (9).

10. The planting container of claim 9, wherein said water-tight film (9) and said natural fiber fabric (21) have a width (W1) larger than said width (W) of said mat and mat coil (1A), whereby a collar (CO) is formed above said mat coil.

11. The planting container of claim 1, further comprising a belt or ring (13) surrounding said coil, at least one bail (14) secured to said belt or ring (13), said bail (14) having an eyelet (15) extending to an upper edge of said coil for securing a handle to said eyelet (15).

12. The planting container of claim 1, wherein said coil end holding means are selected as one or more members from the following group: quilt stitching, adhesive bonding, heat bonding, a wire mesh, envelopes, belts, rings, cuffs, netting, and fabrics all of which are biodegradable.

13. The planting container of claim 1, wherein said plug (19) is a second coil of a second mat smaller than said first mentioned mat and including a growing medium in said second mat.

14. The planting container of claim 13, wherein said plug (10, 19) is held in one end of said planting space (12) by a press fit.

15. The planting container of claim 1, further comprising a reinforcement member (8) secured to a bottom end of said mat coil (1A).

16. A method for making planting containers, comprising the following steps:

(a) preparing a sheet of natural fibers (2) to form an elongated enclosure material having longitudinal edges (2A, 2B), (b) placing a growing medium onto said elongated enclosure material while leaving said longitudinal edges (2A, 2B) free of growing medium, (c) folding said longitudinal edges (2A, 2B) of said elongated enclosure material around said growing medium to form an elongated mat (1) in which said growing medium is enclosed with a uniform thickness (T) throughout the width (W) of said mat, (d) winding said elongated mat onto a core to form a coil having at least one full turn, (e) securing an outer end of said at least one full turn against unwinding, (f) removing said core from said coil to form a planting space (12), and (g) closing one end of said planting space with a plug (10, 19).

17. The method of claim 16, further comprising placing, prior to said folding step, a web (4) of natural fibers onto said growing medium on said elongated enclosure material, placing spacers (3) into end openings of said elongated enclosure, performing said folding of said longitudinal edges (2A, 2B) of said elongated enclosure material over or under said web (4) and over said spacers (3) to form an elongated enclosure, and securing said elongated enclosure material, said web (4) and said spacers (3) to each other.

18. The method of claim 16, further comprising inserting a wire mesh reinforcement into said mat prior to said closing step.

19. The method of claim 16, wherein said preparing and placing steps comprise preparing a first inner layer (18) of intermeshed natural fibers, preparing a second layer (5A) of growing medium and placing said second layer (5A) onto said first layer (18), placing a wire mesh third layer (17) onto said second layer (5A), placing a fourth outer layer (18A) of intermeshed natural fibers onto said third layer, and securing said layers to each other to form said mat.

20. The method of claim 19, further comprising cutting said wire mesh third layer to a length shorter than said first, second and third layers (17) to a length to form but one outer turn of wire mesh, placing said third layer next to a first end of said first, second and fourth layers, and winding said layers into a coil on a core by starting the winding with a second end of said first, second and fourth layers opposite said first end so that, upon completion of the winding, said wire mesh third layer (17) will be positioned in a last outer turn of said coil (1A).

21. The method of claim 16, further comprising winding a water-tight, biodegradable film (9) outwardly around said coil, and further winding a natural fiber fabric (21) or cuff (20) onto said watertight, biodegradable film (9) and closing said fabric or cuff at its ends.

22. The method of claim 16, further comprising enclosing said coil by an endless ring (13), forming a wire bail (14) with an eyelet (15), and securing said wire bail to said endless ring (13) so that said eyelet (15) reaches upwardly to an edge of said coil.

23. The method of claim 16, further comprising positioning spacers (3) of natural fibers onto said elongated enclosure material (2) for separating sections of growing material from each other along said elongated enclosure material, securing said inserts (3) in said elongated mat, and cutting said elongated mat along said spacers (3) to form mat sections of predetermined length (L) for winding said coil to form said planting container.

* * * * *